(12) United States Patent
Denzlein

(10) Patent No.: US 7,721,251 B2
(45) Date of Patent: May 18, 2010

(54) METHOD AND DEVICE FOR CREATING PROJECT PLANNING FOR AN OPERATING DEVICE OF AN AUTOMATION COMPONENT

(75) Inventor: Michael Denzlein, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1076 days.

(21) Appl. No.: 11/068,276

(22) Filed: Feb. 28, 2005

(65) Prior Publication Data

US 2005/0198613 A1 Sep. 8, 2005

(30) Foreign Application Priority Data

Mar. 2, 2004 (DE) .................. 10 2004 010 203

(51) Int. Cl.
*G06F 9/44* (2006.01)
*G06F 3/048* (2006.01)

(52) U.S. Cl. .................. 717/103; 717/102; 717/105; 717/111; 717/120; 717/125; 715/763; 715/765

(58) Field of Classification Search .............. None
See application file for complete search history.

(56) References Cited

U.S. PATENT DOCUMENTS

| | | | | |
|---|---|---|---|---|
| 6,080,204 | A * | 6/2000 | Mendel | 716/7 |
| 6,556,950 | B1 * | 4/2003 | Schwenke et al. | 702/183 |
| 6,862,553 | B2 * | 3/2005 | Schwenke et al. | 702/183 |
| 7,117,040 | B2 * | 10/2006 | Masuda et al. | 700/1 |
| 7,222,312 | B2 * | 5/2007 | Ferguson et al. | 716/3 |
| 7,249,042 | B1 * | 7/2007 | Doerr et al. | 705/7 |
| 2003/0018952 | A1 * | 1/2003 | Roetzheim | 717/101 |
| 2003/0058238 | A1 | 3/2003 | Doak et al. | |
| 2003/0135742 | A1 * | 7/2003 | Evans | 713/189 |
| 2003/0151538 | A1 | 8/2003 | Escobosa et al. | |
| 2003/0174169 | A1 * | 9/2003 | Tiwari et al. | 345/764 |
| 2003/0199051 | A1 * | 10/2003 | Baker et al. | 435/183 |
| 2003/0208723 | A1 * | 11/2003 | Killian et al. | 716/1 |
| 2004/0153412 | A1 * | 8/2004 | Fischer et al. | 705/52 |
| 2004/0249487 | A1 * | 12/2004 | Ahlert et al. | 700/83 |
| 2005/0114828 | A1 * | 5/2005 | Dietrich et al. | 717/101 |
| 2005/0166190 | A1 * | 7/2005 | Hoefler et al. | 717/136 |
| 2006/0020429 | A1 * | 1/2006 | Brooks et al. | 702/189 |

FOREIGN PATENT DOCUMENTS

JP 08223524 A 8/1996
WO WO 02/101596 A2 12/2002

OTHER PUBLICATIONS

Simatic HMI, "ProTool V6.0 Service Pack 2 Windows-basierte Systeme projektieren", User Manual, Dec. 2002, pp. 1-484, Internet:: http://www.energietechnik.fh-dortmund.de/personen/walter/walter/mikrocontroller_infos/Protool/ProTool_WIN_BHB_d.pdf , Retrieved on Sep. 27, 2004.

* cited by examiner

*Primary Examiner*—Tuan Q Dam
*Assistant Examiner*—Isaac T Tecklu

(57) ABSTRACT

To increase the user friendliness of the project planning software (6), it is proposed that information (12, 13, 14, 15) about the applicability of project planning (8) to the operating device (1) be provided, such that the information (12, 13, 14, 15) is recorded directly within the framework of an operating interface of project planning software.

6 Claims, 2 Drawing Sheets

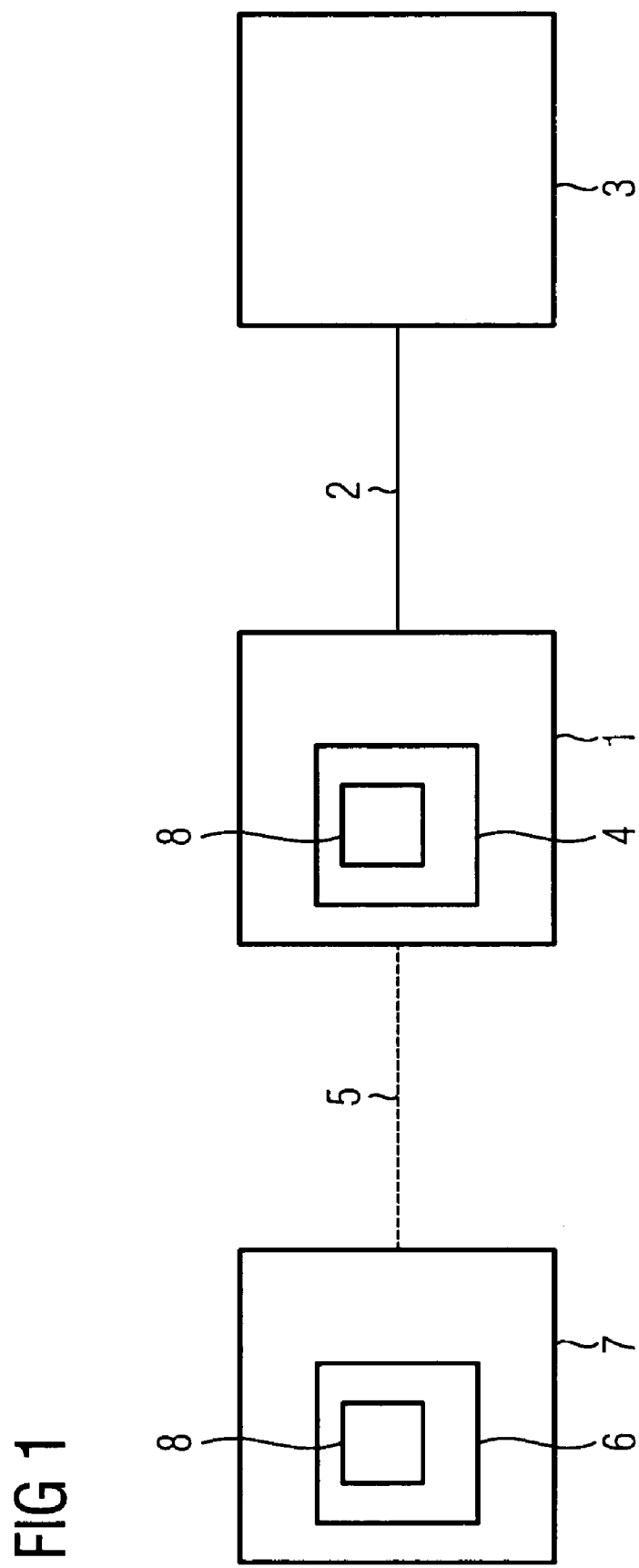

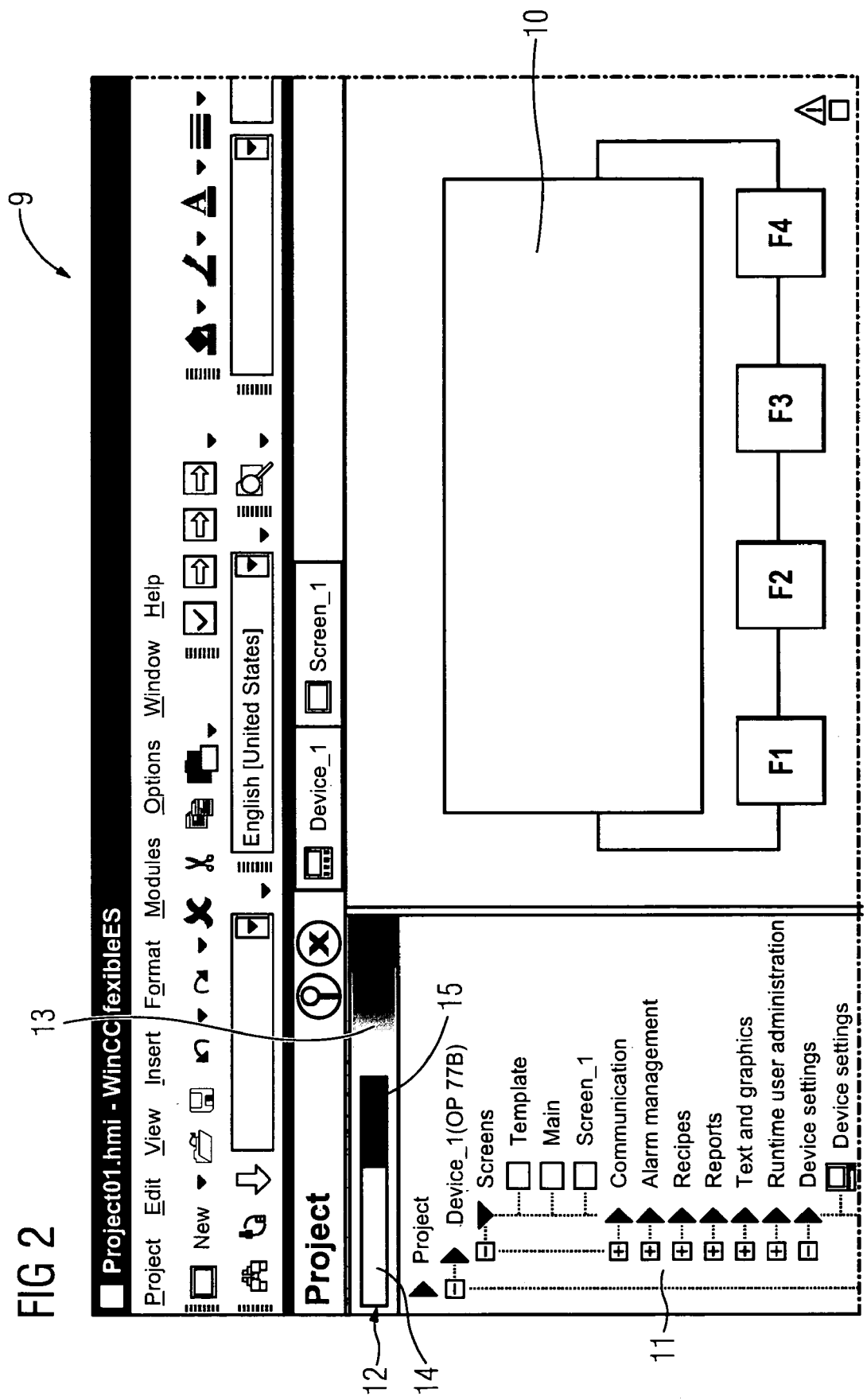

METHOD AND DEVICE FOR CREATING PROJECT PLANNING FOR AN OPERATING DEVICE OF AN AUTOMATION COMPONENT

CROSS REFERENCE TO RELATED APPLICATIONS

This application claims priority to the German application No. 10 2004 010 203.1, filed Mar. 2, 2004 and which is incorporated by reference herein in its entirety.

FIELD OF INVENTION

The invention relates to a method and also to a device for creating project planning for an operating device of an automation component. In particular the invention relates to the creation of a Human-Machine-Interface (HMI).

BACKGROUND OF INVENTION

Operating devices in the form of HMI devices are typically used for visualization and setting of the control variables relevant to the operation of the automation components. HMI devices can for example be HMI display panels, also referred to for short as HMI panels, control panels or also operator panels. An HMI device as a rule comprises a control unit as well as a display unit, for example an LCD display. The control unit comprises for example a central processing unit (CPU) and further components, for example Random Access Memory (RAM) which are connected to a data bus, for example a CPU address and data bus. The HM interface, especially the operating images and their links, is stored in the memory of the control unit here.

Each operating device has a distinct specific hardware configuration. Thus there are operating devices with touchscreens and those with integrated keyboard, operating devices with a color or black and white display etc. In addition each operating device has a specific memory size.

HM interfaces for operating devices are created in what is known as a Configuration System (CS). To this end specific project planning software is run on a host computer, for example a standard PC. After completion of project planning this is transmitted to the operating device.

Displaying the memory requirement of a piece of software is known from the prior art. Thus for example the "SIMATIC HMI, ProTool V6.0, Service Pack 2, Project Planning Windows-based Systems" (order number 6AV6594-1MA06-1AAO) describes the option of displaying the memory requirement for a project as project information after transfer into flash memory of the operating device.

In addition WO 02/101596 A2 describes a method for supporting project planning of manufacturing systems in which a digital model of a manufacturing system containing objects is embedded into a simulation environment. This enables all the information needed for the simulation environment to be provided for simulation.

SUMMARY OF INVENTION

The object of the present invention is to increase the user friendliness of such project planning software. This object is achieved by the claims.

A basic idea behind the invention is to make available to the user of the project planning software information about the applicability of the project planning to the selected operating device. This gives the user direct feedback, even before the project planning is transmitted from the host to the operating device, as to whether the created project planning is capable of functioning in conjunction with the operating device. The information is provided to the user in a way that allows it to be directly recorded.

Advantageous embodiments of the invention are produced by the dependent claims.

A basic idea of the invention is to provide the user of the project planning software with information about the memory usage of project planning and thereby information about usability.

In accordance with a preferred embodiment of the invention the information provided encompasses the current code size of the project planning. In a further embodiment a statement is made on the basis of the code size determined about the transmissibility of the project planning to the operating device and specified to the user.

In accordance with a further preferred embodiment of the invention the information provided encompasses the size of the runtime memory required to execute the project planning. Especially advantageous in this context is specifying runtime memory typically used for project planning and/or specifying the minimum runtime memory and/or specifying a maximum runtime memory in a further embodiment a statement is made, on the basis of the runtime memory requirement determined, about the ability of the project planning to be executed on the operating device and is specified to the user.

A core idea of the invention is to provide the information about the applicability specific to an operating device. This means that the data about the memory requirement etc. is always determined and specified in relation to a concrete operating device. To this end the size of the usable memory available in the operating device is known to the project planning software. This not only means that absolute data for the code or runtime memory size can be specified. Relative data, for example percentage values on the occupancy level of the available memory, are also possible.

The information is provided in accordance with a further embodiment of the invention in visual form. It is especially advantageous in this connection for the information to be displayed directly within the framework of the operator interface. In addition or as an alternative to this, it is of course also possible to output the information in another way, for example via audio signals.

Graphical representations, particularly in the form of bar diagrams, have been shown to be especially suitable for fast recording of the information. The information can be communicated especially well here using colored indicators.

In addition to qualitative indications, for example in the form of colored bars, quantitative information is provided in a further embodiment of the invention in the form of text displays.

To perform the method in accordance with the invention a corresponding device is provided. Such a device is in particular a personal computer or another computer with a provision module which provides the desired functionality.

The provision module can in this case be implemented as a program module or a suitable computer program product which runs on a computer. In other words the computer program product comprises commands which cause the method in accordance with the invention to be executed when the computer program product is run on the computer.

BRIEF DESCRIPTION OF THE DRAWINGS

The present invention is described below with reference to an exemplary embodiment which is explained in greater detail with the aid of drawings. The drawings show:

FIG. 1 a schematic diagram of a CS with an HMI device,
FIG. 2 a screenshot of project planning software.

DETAILED DESCRIPTION OF INVENTION

FIG. 1 shows a typical layout with an HMI device 1 which is connected via a wired or wireless connection 2 with an automation component 3, for example a machine in an assembly line. The HMI device 1 comprises RAM 4 and is connected via a further wired or wireless connection 5 to a personal computer 7 acting as host for executing project planning software 6. For creation of project planning 8 the project planning software 6 is executed on the personal computer 7. Following its creation the project planning 8 is transmitted over the connection 5 from the personal computer 7 into the memory 4 of the HMI device 1.

FIG. 2 shows a typical screenshot 9 of project planning software 6. On the right hand side of the screen an operating screen 10 of an HM interface to be created 10 is depicted. On the left hand side of the screen a bar 12 in a display field 13 is arranged above the project tree 11. This makes it possible for the user of the project planning software 6 to directly obtain, during the project planning information about the memory usage and thereby information about the applicability of project planning 8 for the HMI device 1.

To obtain a display specific to the operating device, the total length of the display field 13 is assigned to the usable memory 4 available in the HMI device 1. The total length of the displayed bar 12 corresponds to the size of the memory 4 required for the transmission and execution of the project planning 8 in the HMI device 1 corresponding to the current status of project planning. The colored bar 12 is divided into a first part 14 for specifying the current code size and of a second part 15 for specifying the required runtime memory immediately adjoining the first part 14. The display field 13 features as its background a color change from green to red running from left to right. If the bar 12 ends in the red area of the background field, the memory 4 of the HMI device 1 is more or less exhausted. Within the bar 13 or in the form of a axis with a corresponding label, additional quantitative statements can be made about the required memory size etc. (not shown).

If the user changes parts of the HM interface, if for example he adds a further operating screen 10, the bar 12 is simultaneously adapted to the changed project planning 8. The size of the project planning 8 and thereby the length of the bar 12 is determined here in the background by a compiler, which calculates the current code size of project planning 8 each time. In addition means for estimating the necessary runtime memory are provided.

If the user establishes during project planning that the size of the memory 4 of the original HMI device 1 provided for the project planning 8 is not sufficient, he can either change the current project planning 8 or select another HMI device 1 with a larger memory 4. If the user selects a new HMI device 1, he is provided once again with the bar display with information updated and tailored to the new HMI device 1.

The invention claimed is:

1. A method for creating a project planning for an operating device of a automation component, the method comprising:
   providing direct information about the applicability of the project planning for the operating device such that the information can be directly recorded within the framework of a operating interface of project planning software,
   separately displaying information about the applicability of the project planning for the operating device on both the operating interface and a computer at the same time,
   wherein information about the size of a runtime memory required to execute the project planning in the operating interface is visually represented on a computer screen by the total length of a display bar,
   wherein a change in the size of runtime memory required to execute the project planning in the operating interface results in a change in the total length of the display bar,
   wherein the computer displays the runtime memory display bar and an operating screen of the operating interface on the same screen,
   wherein the display bar includes a color changing background indicating the usable memory of the operating interface, the color changing background comprising at least a first background color transitioning to a second background color,
   wherein extension of the length of the display bar from the first background color in the direction of the second background color indicates progressively more of the amount of memory of the operating interface that is needed to execute the project planning in accordance with the runtime memory requirement, and
   wherein when the total length of the display bar extends past the first background color to further most distal end of the second background color the memory limit of the operating interface is reached.

2. The method in accordance with claim 1, further comprising executing computer program commands for the project planning on the computer.

3. The method of claim 1 wherein the display bar is divided into a first part for specifying a current code size and a second part for specifying the required runtime memory immediately adjoining the first part,
   wherein a visual indication of the current code size is presented on the computer screen thereby providing a comparison to the required runtime memory.

4. The method in accordance with claim 1,
   wherein the display bar is divided into a first part for specifying a current code size and a second part for specifying the required runtime memory immediately adjoining the first part, and
   wherein a visual indication of the current code size is presented on the computer screen thereby providing a comparison to the required runtime memory and a comparison to the amount of useable memory of the operator interface.

5. A device for creation of a project planning for an operating device of an automation component, the device comprising:
   a provision module for providing direct information about the applicability of the project planning for the operating device such that the information can be directly captured within the framework of an operator interface of a project planning software, random access memory for storing the information about the applicability of the project planning
   separately displaying information about the applicability of the project planning for the operating device on both the operator interface of the operating device and a computer at the same time,
   wherein information about the size of a runtime memory required to execute the project planning in the operator interface is visually represented on a computer screen by the total length of a display bar, wherein a change in the size of runtime memory required to execute the project planning in the operator interface results in a change in the total length of the display bar, wherein the computer displays the runtime memory display bar and an operating screen of the operator interface on the same screens;

wherein the display bar includes a color changing background indicating the usable memory of the operator interface, the color changing background comprising at least a first background color transitioning to a second background color;

wherein extension of the length of the display bar from the first background color in the direction of the second background color indicates progressively more of the amount of memory of the operator interface that is needed to execute the project planning in accordance with the runtime memory requirement; and wherein when the total length of the display bar extends past the first background color to further most distal end of the second background color the memory limit of the operator interface is reached.

6. The device of claim 5 wherein the display bar is divided into a first part for specifying a current code size and a second part for specifying the required runtime memory immediately adjoining the first part, wherein a visual indication of the current code size is presented on the computer screen thereby providing a comparison to the required runtime memory.

* * * * *